US006055062A

United States Patent [19]

Dina et al.

[11] Patent Number: 6,055,062
[45] Date of Patent: Apr. 25, 2000

[54] ELECTRONIC PRINTER HAVING WIRELESS POWER AND COMMUNICATIONS CONNECTIONS TO ACCESSORY UNITS

[75] Inventors: Daniel Dina, Nampa; Wesley Alan Fujii, Boise, both of Id.

[73] Assignee: Hewlett-Packard Company, Palo Alto, Calif.

[21] Appl. No.: 08/995,664

[22] Filed: Dec. 19, 1997

[51] Int. Cl.[7] .......... G06K 9/22
[52] U.S. Cl. .......... 358/1.13; 358/1.14; 358/1.12
[58] Field of Search .......... 395/113, 101, 395/112, 114; 399/37, 88–90, 336; 340/310.07; 455/41, 151.2; 358/1.13, 1.01, 1.12, 1.14

[56] References Cited

U.S. PATENT DOCUMENTS

| | | | |
|---|---|---|---|
| 5,235,453 | 8/1993 | Freyer et al. | 359/144 |
| 5,393,959 | 2/1995 | Kitano et al. | 219/613 |
| 5,682,575 | 10/1997 | Komori | 399/66 |
| 5,761,565 | 6/1998 | Baker et al. | 399/519 |
| 5,857,065 | 1/1999 | Suzuki | 395/114 |

OTHER PUBLICATIONS

European Search Report.

*Primary Examiner*—Mark K. Zimmerman
*Assistant Examiner*—Lance W. Sealey

[57] ABSTRACT

An electronic printer having wireless power and communications connections to accessory units to which it is adjacent and with which it is in contact during operation is disclosed. Communications between the printer and the accessory unit, instead of being handled via a cable connection, are achieved using a two-way, infrared (IR) communications link. Power is supplied to the accessory via inductive coupling rather than directly through power cables. As inductive coupling works efficiently only over very short distances, the accessory unit is equipped with a standby battery power so that the accessory may be temporarily separated from the printer (e.g., in order to eliminate media jams) without loss of accessory status data. When the accessory is once again positioned immediately adjacent the printer, the inductive coupling reassumes the role of power provision. The invention eliminates problems associated with cable connections, such as the inadvertent disconnection of a power or communication cable, damage to connectors over the operational lifetime of the printer and its accessory, as well as manufacturing and stocking costs associated with the connector cables.

20 Claims, 2 Drawing Sheets

ELECTRONIC PRINTER HAVING WIRELESS POWER AND COMMUNICATIONS CONNECTIONS TO ACCESSORY UNITS

FIELD OF THE INVENTION

This invention relates to electronic printers and, more particularly, to printers having attached accessory units which require power and communications connections between the printer and accessory unit.

BACKGROUND OF THE INVENTION

The past twenty years have witnessed an incredible variety of printers designed for digital computers. For years, the line printer was the mainstay of the computer industry. Then, in the mid-1970's, the personal computer revolution began with the appearance of primitive computers based on the S-100 bus. With the appearance of more user-friendly computers from Apple Computer and, later, from IBM Corporation, the demand for personal computers soared. The public's almost insatiable appetite for personal computers has spawned a virtual explosion of technology. Printer technology has been one of the principal beneficiaries of that technology explosion. Early on, dot-matrix printers grabbed the lion's share of the market. For less than a decade, daisywheel printers shared the limelight for letter-quality printing tasks. Thermal printers were briefly used for portable applications. High-resolution dot-matrix printers and ink-jet printers sounded the death knell for daisywheel printers. Though greatly reduced in number, dot matrix printers seem to have found a niche for multiple form printing applications.

Laser computer printers have been around almost since the beginning of the personal computer revolution. In late 1980, Xerox Corporation introduced a laser printer for mainframe computers. Retail priced at a lofty $298,000, it could print more than 30 pages a minute. However, it was not until the Hewlett Packard Company began marketing the LaserJet series of laser printers that laser printers for personal computers became commonplace. Color laser printers, which are now becoming more affordable, may eventually become as ubiquitous as the black-and-white laser printers.

Modern electronic printers (especially those employing laser copying technology) are often equipped with accessories such as optional media (e.g., paper) supply units, optional media output handlers such as sorters and collators, paper binding units such as staplers, and various other media handlers. These additional components generally require communications with the printer and some sort of power source. Typically, the power and communications requirements are handled with cables which interconnect the accessory to the printer. The use of cables is somewhat problematic for the following reasons:

(1) Power or communication disruption caused by wire breakage or inadequate securing of the cable ends;

(2) Connector failure;

(3) The added cost of providing a reliable cable and reliable associated connectors (two female and two male for each cable);

(4) Inoperability of the equipment due to improper cable installation;

(5) Damage occasioned by repeated connection and disconnection of the accessory over the life of the equipment;

(6) Tangling of the cables; and (7) Procurement requirements.

Consequences related to the foregoing problems can be anything from merely an annoyance to printer inoperability. Inoperability is most likely to occur after an accessory has been removed or separated from the printer during media jam clearance and/or repositioning.

What is needed is a system for providing printer accessory power and communications without the use of cables or connectors.

SUMMARY OF THE INVENTION

Printer accessories are generally located adjacent and in contact with the printer. Rather than handle communications between an accessory and its printer through cables, the same result may be achieved using a two-way, infrared (IR) communications link. Operating commands from the printer to the accessory and accessory status information are communicated over this link. Power transmission from the printer to the accessory can be provided through inductive coupling. As inductive coupling works effectively only over very short distances, it is essential to provide the accessory with a standby power unit so that the accessory may be separated from the printer without loss of accessory status data. When the accessory is once again positioned immediately adjacent the printer, the inductive coupling reassumes the role of power provision.

An exemplary application of the invention to existing technology is that of a Multi-Bin Mailbox (MBM) accessory coupled to a high-speed laser printer such as the Hewlett-Packard model 5Si. Customer support calls are often received when power supplied to the MBM becomes disconnected, one of the communication cables becomes unplugged or is incorrectly connected, or the cables become tangled to an extent that the MBM cannot be correctly positioned adjacent the printer for proper operation. Inductive power transmission from the printer to the MBM and infrared communication links between the MBM and the printer will eliminate the aforementioned problems.

Because plain-paper copiers, facsimile machines and printers share many components in common, there has recently been a blurring of the distinction between those three types of machines. Combination units are produced by various manufacturers. Some types utilize laser or LED-based photocopy engines, while others rely on ink-jet technology. Because of this blurring that has occurred, the invention disclosed herein, though directed primarily to printer applications, is equally applicable to plain-paper copiers and facsimile machines which have removable accessories.

DETAILED DESCRIPTION OF THE INVENTION

The present invention will now be described as applied to a laser printer coupled to a Multi-Bin Mailbox (MBM)

accessory. However, it should not be assumed that the invention is limited to such a combination. As previously mentioned in the Background section of this disclosure, the invention may be applied to printers employing many types of printing technology. For example, the invention may be practiced with printers employing ink-jet, laser, LED, dot-matrix, and other printing technologies. In addition, it may also be applied to black-and-white and color copiers, as well as to facsimile transmission and receiving machines, or to machines which function as a combination of printer, copier, and facsimile machine.

Figures 1, 2, 3:
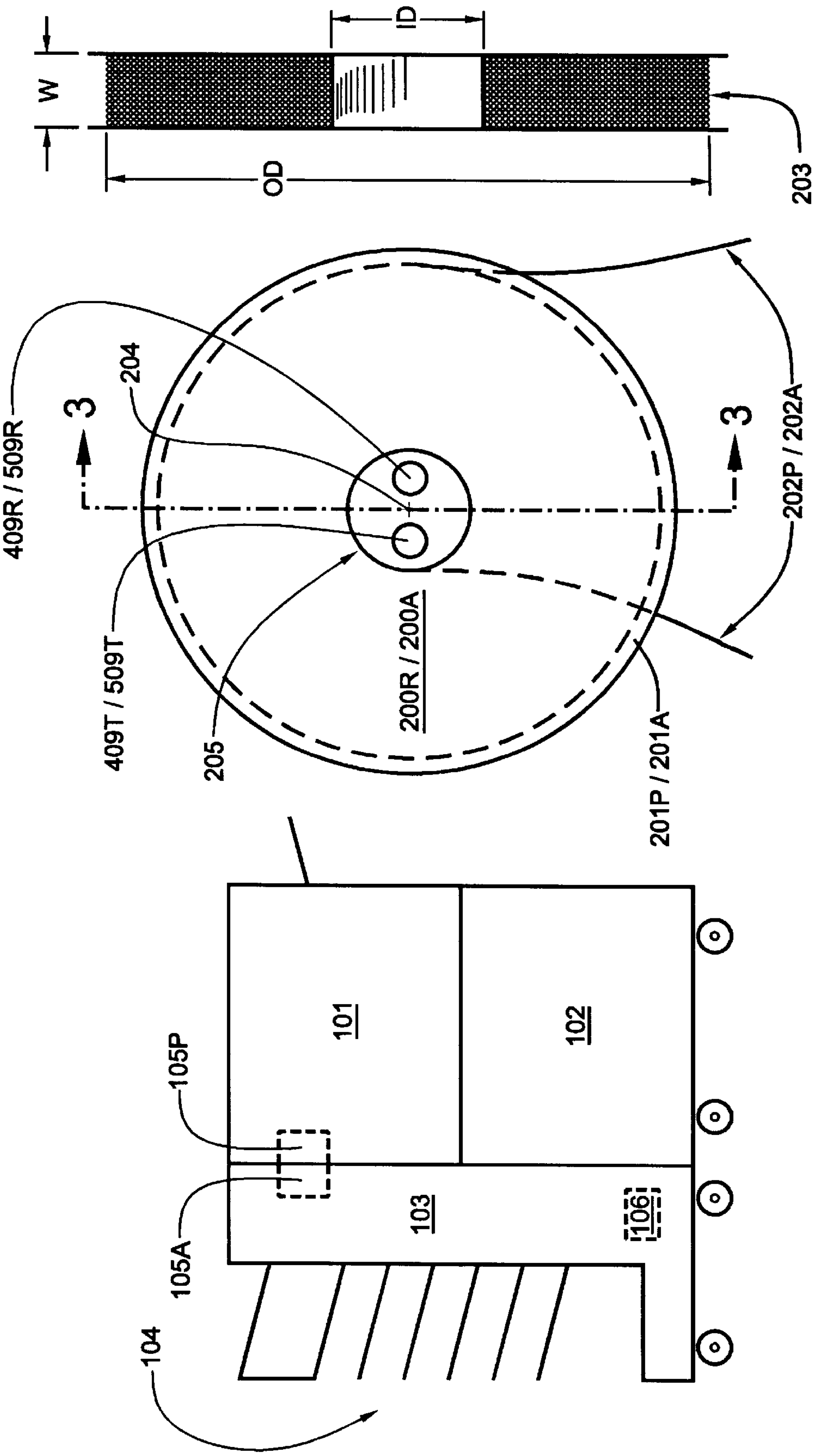
FIG. 1 is a block diagram of a printer coupled to a multi-bin mailbox using the cableless approach of the present invention.
FIG. 2 is a side elevational view of one of a pair of coils used for inductively-coupled power transmission, the view being perpendicular to the coils central axis.
FIG. 3 is a cross-sectional view of the coil of FIG. 2 taken through section line 3—3.

The block diagram of FIG. 1 depicts a laser printer 101 mounted on a wheeled cart 102, and an attached Multi-Bin Mailbox (MBM) accessory 103, which provides media collating and binding (e.g., stapling) functions under control of the printer 101. The MBM has multiple bins 104 to which collated stacks of printed media may be sent under printer command. The MBM 103 is normally positioned directly adjacent and in contact with the printer 101. Power transfer from the printer 101 to the accessory 103 is provided via inductive coupling and communications between the printer 101 and the accessory 103 are handled by a two-way serial electromagnetic radiation communications link. For a preferred embodiment of the invention, the communications link operates in the infrared range of frequencies. A pair of transceivers are employed to provide communications between the printer and its accessory over an air gap. Each IR transceiver employs a pair of light emitting diodes; one for signal transmission, the other for signal reception. The inductive coupling feature requires a printer-side inductor (i.e., coil), as well as an accessory-side inductor. Likewise, the IR communications link requires both printer-side circuitry and accessory-side circuitry. For a preferred embodiment of the invention, both the inductor and the communications link circuitry for is housed in a single module. Referring once again to FIG. 1, it will noted that the printer has its own coupling module 105P, while the accessory has its own coupling module 105A. These modules are positioned face-to-face when the accessory 103 is operating as a slave of the printer 101. The design of each module will be subsequently described in more detail. The accessory is also equipped with a standby battery 106, which provides power to the accessory for saving accessory status data when the accessory 103 is moved away from the printer 101 so that efficiency of the accessory's inductively-coupled power system drops below a usable level.

Referring now to FIGS. 2 and 3, the type of inductor used in both the printer coupling module 105P and in the accessory coupling module 105A is depicted. The inductor is a hollow-core, coil (200P for the printer-side coupling module; 200A for the accessory-side coupling module) having a width W of approximately 1.3 cm, an outside diameter OD of approximately 10 cm, an inside diameter ID of about 2.5 cm, and between 300 to 500 turns of insulated wire 203 wound around a non-ferromagnetic bobbin 201. Alternatively, a solid core ferromagnetic bobbin may also be used if more efficient power delivery is required. Both an infrared-transmitting light-emitting diode (409T for the printer side coupling module; 509T for the accessory side coupling module) and an infrared receiving LED (409R for the printer side coupling module; 509R for the accessory side coupling module) are mounted within the hollow core 205 of the coil. In the event a solid core ferromagnetic bobbin is used, the LEDs are disposed within separate voids or holes disposed in the bobbin. Alternatively, the LEDS can be located at any other position that enables communications. When the printer coupling module coil 200P with its associated diode pair (409T and 409R) is positioned adjacent the accessory coupling module coil 200A and its associated diode pair (509T and 509R) in a face-to-face configuration, both inductive coupling and communications coupling can proceed across a small air gap. Each coil (200P and 200A) has a central axis (204P and 204A) and a pair of lead wires (202P and 202A, respectively). For coil 200P, an alternating current is applied to lead wires 202P during operation of the printer 101. Power for the accessory 103 is provided at the lead wires 202A of coil 200A. When coil 200A is within a distance of a centimeter or so from coil 200P and the two coils are coaxially facing one another, an alternating current sufficient to power the accessory 103 will be induced in coil 200A.

Figure 4:
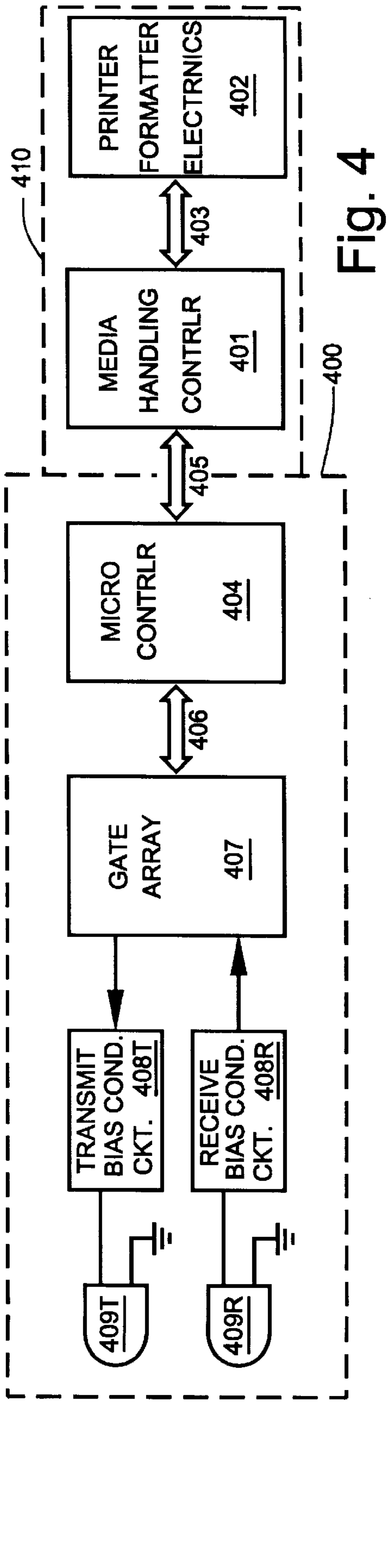
FIG. 4 is a block diagram of printer-side circuitry for the infrared communication link.

Referring now to the block diagram of the printer-side communications circuitry of FIG. 4, printer control circuitry includes a media (e.g., paper) handling controller 401 and printer formatter electronics 402. The media handling controller receives commands from and sends status information relating to attached paper handling systems to the formatter electronics 402 over printer communications bus 403. Some of the commands which might, for example, be sent to an MBM accessory 103 from the printer 101 are:

(1) direct the media output received from the printer to x number of multiple bins;

(2) direct the media output received from the printer to the same x number of bins in reverse order; and (3) staple the media stack in each bin.

In a cable-connected system, the paper handling controller 401 would communicate directly with the high-capacity output (HCO) controller 501 over a 15-conductor cable. (The MBM discussed herein is an example of an HCO device. Another exemplary HCO device is a stacker.) However, as this invention requires communication over a serial infrared link, commands from the paper handling controller 401 must be converted from parallel data to serial data which is transferred over the air gap between the printer coupling module 105P and the accessory coupling module 105A. In order to accomplish this task, parallel data from the paper handling controller 401 are sent to a microcontroller 404, which for a presently preferred embodiment of the invention is an 8051XA microcontroller via a 15-pin interface 405. The microcontroller 404 sends the parallel data over an 8-bit interface 406 to a gate array 407. The gate array 407 converts the received parallel data to serial data. The serial data is output from the gate array 407 to a transmit bias conditioning circuit (constructed from resistors and capacitors) 408T, which insures proper current and voltage levels to a printer-side transmit LED 409T.

Still referring to FIG. 4, when data relating to operational status of accessory 103 is received by the printer-side receive LED 409R from the accessory coupling module 105A, the signal is received as a serialized pulses, which are sent to the gate array 407 via a receive bias conditioning circuit 408R. The gate array 407 converts the pulses parallel data and loads it into one of its registers. The microcontroller 404, upon being notified that an incoming byte is waiting in the register of gate array 407, reads the byte and sends it to the paper handling controller 401, which then formulates an appropriate printer response to the received data. For a preferred embodiment of the invention, all circuitry enclosed within the broken line-box 400 are contained within the printer coupling module 105P.

The accessory-side communications circuitry functions in a manner similar to that of the printer-side communications circuitry. Referring now to the block diagram of the accessory-side communications circuitry of FIG. 5, commands in the form of serial data are received by accessory-side receive LED 508R. The serial data is received by a gate array 507 via a receive bias conditioning circuit 508R. The gate array 507 converts the pulses to parallel data and loads it into one of its registers. The accessory-side microcontroller 504, upon being notified that an incoming byte is waiting in the register of gate array 507, reads the byte over 8-bit interface 506 and sends it, over a 15-bit interface 505, to the HCO controller 501. The HCO controller 501 then sends appropriate responses to the HCO electronics, the accessory motors and accessory solenoids 502.

Some of the status data that the MBM accessory 103 might send to its associated printer 101 are:

(1) bin number n is full;

(2) a jam has occurred;

(3) the staple supply is low;

(4) the staple supply is depleted; and (5) a misfeed has occurred.

Figure 5:
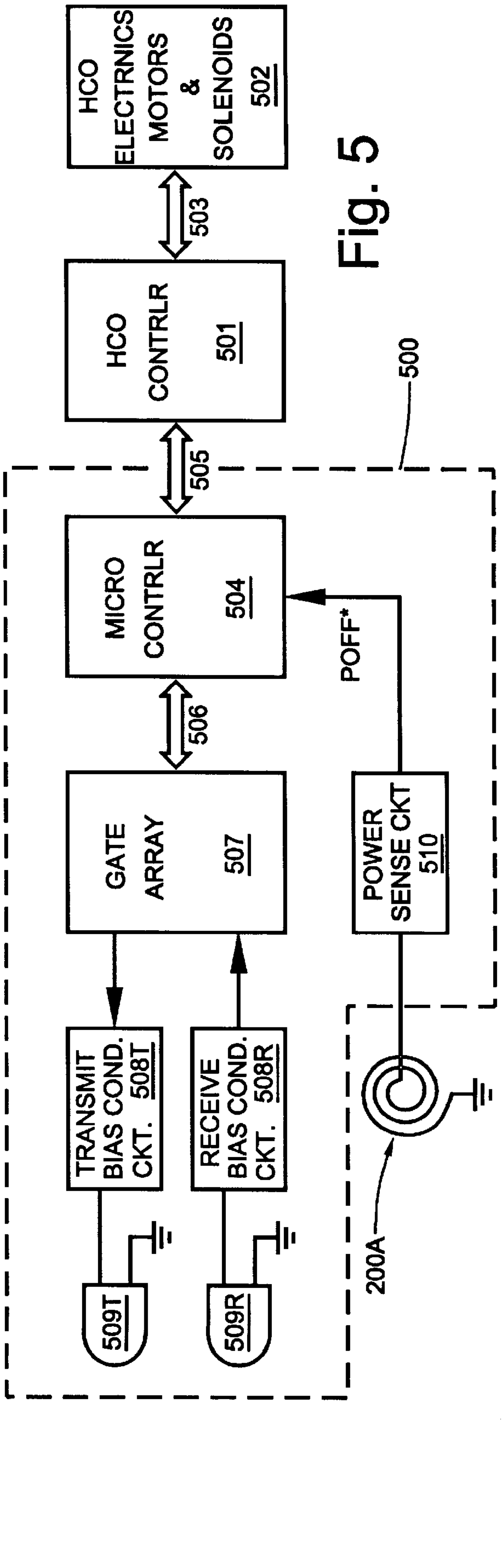
FIG. 5 is a block diagram of accessory-side circuitry for the infrared communication link.

Still referring to FIG. 5, when the HCO electronics 502 detects a reportable status condition, that condition is relayed to the HCO controller 501 over the accessory data bus 503. The HCO controller, in turn, sends parallel status data via the 15-pin interface 505 to the accessory-side microcontroller 504, which for a presently preferred embodiment of the invention is also an 8051XA microcontroller. The microcontroller 504 sends the parallel data over an 8-bit interface 506 to a gate array 507. The gate array 507 converts the received parallel data to serial data. The serial data is output from the gate array 507 to a transmit bias conditioning circuit 508T, which insures proper current and voltage levels to accessory-side transmit LED 509T. Receipt of the signal by the printer-side receive LED 409R has been heretofore described.

Still referring to FIG. 5, a power sense circuit 510 continuously monitors induced voltage in accessory coupling module coil 200A. Normally, 24 volts AC is induced on the windings of coil 200A. The alternating current is used to directly power a number of the accessory's motors. A certain portion of the induced current is rectified and converted to DC current at a lower voltage. This DC current is used to power the electronics of accessory 103. As the accessory coupling module coil 200A is separated from the printer coupling module coil 200P, voltage begins to drop off rapidly as the distance between the two coils is increased. Sense circuit 510 establishes a minimum threshold voltage for the operation of accessory 103. When voltage on coil 200A drops below this minimum threshold, sense circuit 510 generates a power off interrupt signal POFF* which is received by the microcontroller 504. The microcontroller 504 immediately notifies the HCO controller 501 over the 15-bit interface 505. The HCO controller immediately switches power to the standby battery 106, while the microcontroller 504, in conjunction with the HCO controller 501, performs all housekeeping duties required to save all essential status data related to the operation of accessory 103. Thus, when the accessory 103 is repositioned next to the printer 101 such that power is restored to the accessory 103, a complete reset of the accessory 103 will not be required. For a preferred embodiment of the invention, all circuitry enclosed within the broken line-box 500 are contained within the accessory coupling module 105A.

Although only a single embodiment of the new is described herein, it will be obvious to those having ordinary skill in the art that changes and modifications may be made thereto without departing from the scope and the spirit of the invention as hereinafter claimed. For example, communications between the printer and its accessory may also be carried out using electromagnetic radiation of other than infrared frequencies. Additionally, the tasks of power coupling and communications may each be handled by separate module pairs rather than a single module pair.

What is claimed is:

1. A printer and accessory pair comprising:

an inductive coupler through which said accessory receives operating power from said printer; and a bi-directional electromagnetic radiation link through which said printer and accessory communicate with each other.

2. The printer and accessory pair of claim 1, wherein said electromagnetic radiation link operates within the infrared range of frequencies.

3. The printer and accessory pair of claim 1, wherein said inductive coupler comprises first and second coils, said first coil receiving alternating current from power available to said printer, said second coil being positioned adjacent said first coil and being inductively coupled to said first coil, said second coil providing power for normal operation of said accessory.

4. The printer and accessory pair of claim 3, which further comprises a standby battery which provides power to said accessory when inductive coupling between first and second coil is insufficient to generate sufficient current in said second coil to meet the power demands of said accessory.

5. The printer and accessory pair of claim 1, wherein said bi-directional link comprises:

a first electromagnetic radiation transceiver coupled to printer control circuitry; and a second electromagnetic radiation transceiver coupled to accessory control circuitry, both said first and said second transceivers operating in a serial data transmission and reception mode.

6. The printer and accessory pair of claim 5, wherein said first transceiver comprises printer-side transmit and receive light-emitting diodes, each of which is coupled to printer control circuitry via a first gate array and a first microcontroller, and said second transceiver comprises accessory-side transmit and receive light-emitting diodes, each of which is coupled to accessory control circuitry via a second gate array and a second microcontroller, said first and second gate arrays performing parallel to serial data conversions for transmitted communications and serial to parallel data conversions for received communications.

7. A power and communications coupling system for a printer and an adjacently positioned accessory, said coupling system comprising:

a first coil through which alternating current supplied by the printer is passed; and a first electromagnetic radiation transceiver coupled to printer control circuitry; and a second coil inductively coupled to said first coil, said second coil providing power for normal operation of said accessory; and a second electromagnetic radiation transceiver coupled to accessory control circuitry.

8. The power and communications coupling system of claim 7, wherein said first and second electromagnetic radiation transceivers operate within the infrared range of frequencies.

9. The power and communications coupling system of claim 7, wherein said printer control circuitry includes media handling controller circuitry.

10. The power and communications coupling system of claim 9, wherein said printer control circuitry further includes printer formatter electronics.

11. The power and communications coupling system of claim 8 wherein said first and second transceivers operate in a serial data transmission and reception mode and said first transceiver comprises printer-side transmit and receive light-emitting diodes, each of which is coupled to printer control circuitry via a first microcontroller.

12. The power and communications coupling system of claim 11, wherein each of said printer-side light-emitting diodes is coupled to said first microcontroller via a first gate array which performs parallel to serial data conversions for transmitted communications and serial to parallel data conversions for received communications.

13. The power and communications coupling system of claim 12, wherein said second transceiver comprises accessory-side transmit and receive light-emitting diodes, each of which is coupled to accessory control circuitry via a second microcontroller.

14. The power and communications coupling system of claim 13, wherein each of said accessory-side light-emitting diodes is coupled to said second microcontroller via a second gate array which performs parallel to serial data conversions for transmitted data and serial to parallel data conversions for received data.

15. The power and communications coupling system of claim 7, wherein each coil is wound on a separate bobbin having a central axis, and both coils are positioned coaxially adjacent one another during accessory operation.

16. The power and communications coupling system of claim 14, wherein each coil is wound on a separate bobbin having a hollow-core and a central axis, both coils are positioned coaxially adjacent one another during accessory operation, and both transmit and receive light-emitting diodes are positioned within the hollow core of each coil.

17. The power communications coupling system of claim 13, wherein said accessory coupling module further comprises a power sense circuit which constantly monitors induced voltage in said second coil, said power sense circuit sending an interrupt signal to said second microcontroller when induced voltage drops below a set threshold, said second microcontroller initiating the saving of data related to operational status of said accessory.

18. The power communications coupling system of claim 17, which further comprises a standby battery which provides backup power to the control circuitry of said accessory when said interrupt signal is sent to said second microcontroller.

19. A printer and accessory pair, said accessory receiving operating power from the printer through inductive coupling, and said printer and accessory communicating with each other via a bidirectional electromagnetic radiation link.

20. The printer and accessory pair of claim 19, wherein said electromagnetic radiation link operates within the infrared range of frequencies.

* * * * *